US012351992B2

(12) United States Patent
Northrup

(10) Patent No.: US 12,351,992 B2
(45) Date of Patent: Jul. 8, 2025

(54) IMPRINTING FILM FOR A BUILDING MATERIAL AND SYSTEM AND METHOD FOR USE OF SAME

(71) Applicant: Austin Concrete LLC, Austin, TX (US)

(72) Inventor: Robert Northrup, Austin, TX (US)

(73) Assignee: Austin Concrete LLC, Austin, TX (US)

( * ) Notice: Subject to any disclaimer, the term of this patent is extended or adjusted under 35 U.S.C. 154(b) by 0 days.

(21) Appl. No.: 18/045,810

(22) Filed: Oct. 11, 2022

(65) Prior Publication Data

US 2023/0111563 A1 Apr. 13, 2023

Related U.S. Application Data

(63) Continuation of application No. 16/379,947, filed on Apr. 10, 2019, now abandoned.

(Continued)

(51) Int. Cl.

*E01C 19/43* (2006.01)
*B28B 11/00* (2006.01)
*B44B 5/00* (2006.01)

(52) U.S. Cl.

CPC ............ *E01C 19/43* (2013.01); *B28B 11/001* (2013.01); *B44B 5/00* (2013.01)

(58) Field of Classification Search

CPC ....... E01C 19/43; B28B 11/001; B28B 11/04; B28B 11/08; B28B 7/0076; B44B 5/00; B44C 3/046

See application file for complete search history.

(56) References Cited

U.S. PATENT DOCUMENTS 4,134,956 A 1/1979 Suzuki et al.
4,204,009 A 5/1980 Feng et al.

(Continued)

FOREIGN PATENT DOCUMENTS

CN 106116690 11/2016
EP 0568841 11/1993

(Continued)

OTHER PUBLICATIONS

KR-20090098600-A Machine Translation of Description (Year: 2023).*

(Continued)

*Primary Examiner* — Cynthia L Schaller
(74) *Attorney, Agent, or Firm* — Scott Griggs; Griggs Bergen LLP

(57) ABSTRACT

An imprinting film for a building material, and a system and method for use of the same are disclosed. In one embodiment of the imprinting film, a transparent film has first and second imprinting states. In the first imprinting state, a first side of the transparent film includes a pigment photomask defining an image and a second side includes a mold receiving surface. In the second imprinting state, the second side includes a relief of the image on the mold receiving surface. The mold receiving surface is configured to receive a molding material and the molding material hardening into the building material. The transparent film transitions from the first imprinting state to the second imprinting state in response to the second side being coated with a light-sensitive, non-laminate adhesive layer and a light source irradiating the first side.

18 Claims, 2 Drawing Sheets

Related U.S. Application Data

(60) Provisional application No. 62/772,938, filed on Nov. 29, 2018.

(56) References Cited

U.S. PATENT DOCUMENTS

| | | | |
|---|---|---|---|
| 4,572,764 A | 2/1986 | Fan | |
| 4,595,543 A | 6/1986 | Williams | |
| 4,732,838 A | 3/1988 | Sechi et al. | |
| 4,889,666 A | 12/1989 | Kawasaki | |
| 5,372,676 A | 12/1994 | Lowe | |
| 5,627,345 A | 5/1997 | Yamamoto et al. | |
| 5,900,180 A | 5/1999 | Scott et al. | |
| 5,922,517 A | 7/1999 | Bhatt et al. | |
| 6,001,739 A | 12/1999 | Konishi | |
| 6,323,287 B1 | 11/2001 | Foster et al. | |
| 6,664,029 B1 | 12/2003 | Imai et al. | |
| 8,232,502 B2 | 7/2012 | Young et al. | |
| 9,758,943 B1 * | 9/2017 | Anderson | B28B 7/0073 |
| 2014/0147634 A1 * | 5/2014 | Dale | E04G 9/10 249/117 |

FOREIGN PATENT DOCUMENTS

| | | | |
|---|---|---|---|
| JP | 2003211428 A | * | 7/2003 |
| KR | 20090098600 A | * | 9/2009 |

OTHER PUBLICATIONS

JP-2003211428-A Machine Translation of Description (Year: 2023).*

"Laminate" definition from Merriam-Webster on-line dictionary (Year: 2024).*

Reckli, Design Your Concrete, Photo Concrete, p. 1, https://www.reckli.com/en/products/photo-concrete/.

Reckli Gmbh, Technical Pamphlet, Reckli artico neo, Film for photo concrete, Products 06020, Edition 06/18, pp. 1-4, Recki GmbH, Herne, Germany, https://www.reckli.com/fileadmin//user_upload/06020_Artico_neo_en.pdf.

Reckli Gmbh, Reckli Photo-Engraving, Reckli Foto-Gravur, pp. 1-16, Reckli Gmbh, Herne, Germany, https://www.reckli.com/fileadmin//user_upload/global/downloads/brochures/reckli_de-en_fotogravur.pdf.

Camillo, Jim; Best Practices for UV-Cure Adhesives, Assembly Magazine, Mar. 1, 2016, 6 pages; https://www.assemblymag.com/articles/93272-best-practices-for-cure-adheaives[Apr. 21, 2021 9:51:38 AM].

* cited by examiner

IMPRINTING FILM FOR A BUILDING MATERIAL AND SYSTEM AND METHOD FOR USE OF SAME

PRIORITY STATEMENT & CROSS-REFERENCE TO RELATED APPLICATIONS

This application claims priority from co-pending U.S. patent application Ser. No. 16/379,947, entitled "Imprinting Film for a Building Material and System and Method for Use of Same" filed on Apr. 10, 2019, in the name of Robert Northrup; which claims the benefit of U.S. patent application Ser. No. 62/772,938, entitled "Imprinting Film for a Building Material and System and Method for Use of Same" filed on Nov. 29, 2018 in the name of Robert Northrup; both of which are hereby incorporated, in entirety, by reference for all purposes.

TECHNICAL FIELD OF THE INVENTION

This invention relates, in general, to building materials, such as mortars, cements, and concrete and, in particular, to an imprinting film for building materials, as well as related engraved plate and mold systems, and a method for use of the same that are suitable for small as well as large imprints.

BACKGROUND OF THE INVENTION

Various techniques exist for imparting permanent imprints on mortars, cements, concrete and the like. Existing techniques include stamping before curing, the use of rolling stamps, and acid etching and dying on cured concrete, for example. Imprints with high quality detail have proven difficult as expensive and complex chemical etching is required. As a result of consumer preferences, particularly consumer preferences for imprints with high quality detail, there is a need for improved systems and methods for imparting permanent imprints on mortars, cements, concrete and the like.

SUMMARY OF THE INVENTION

It would be advantageous to achieve imprinting techniques that would improve upon existing limitations in functionality. It would also be desirable to enable a mechanical and chemical-based solution that would provide enhanced systems and methods for imparting permanent imprints on mortars, cements, concrete and the like. To better address one or more of these concerns, an imprinting film for a building material and system and method for use of the same are disclosed. In one embodiment of the imprinting film, a transparent film has first and second imprinting states. In the first imprinting state, a first side of the transparent film includes a pigment photomask defining an image and a second side includes a mold receiving surface. In the second imprinting state, the second side includes a relief of the image on the mold receiving surface. The mold receiving surface is configured to receive a molding material and the molding material hardening into the building material. The transparent film transitions from the first imprinting state to the second imprinting state in response to the second side being coated with a light-sensitive, non-laminate adhesive layer and a light source irradiating the first side.

In another embodiment, an imprinting film system for manufacturing an engraved plate made of a building material is disclosed. The system includes an imprinting film and a building material in the shape of the engraved plate having an engraving. In still another embodiment, an imprinting film system for manufacturing a mold for use with a building material is disclosed. This system includes an imprinting film and a building material in the shape of an engraved plate having an engraving. The building material is hardened from a molding material. A mold forms in the shape of the mold, which is hardened from another molding material. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
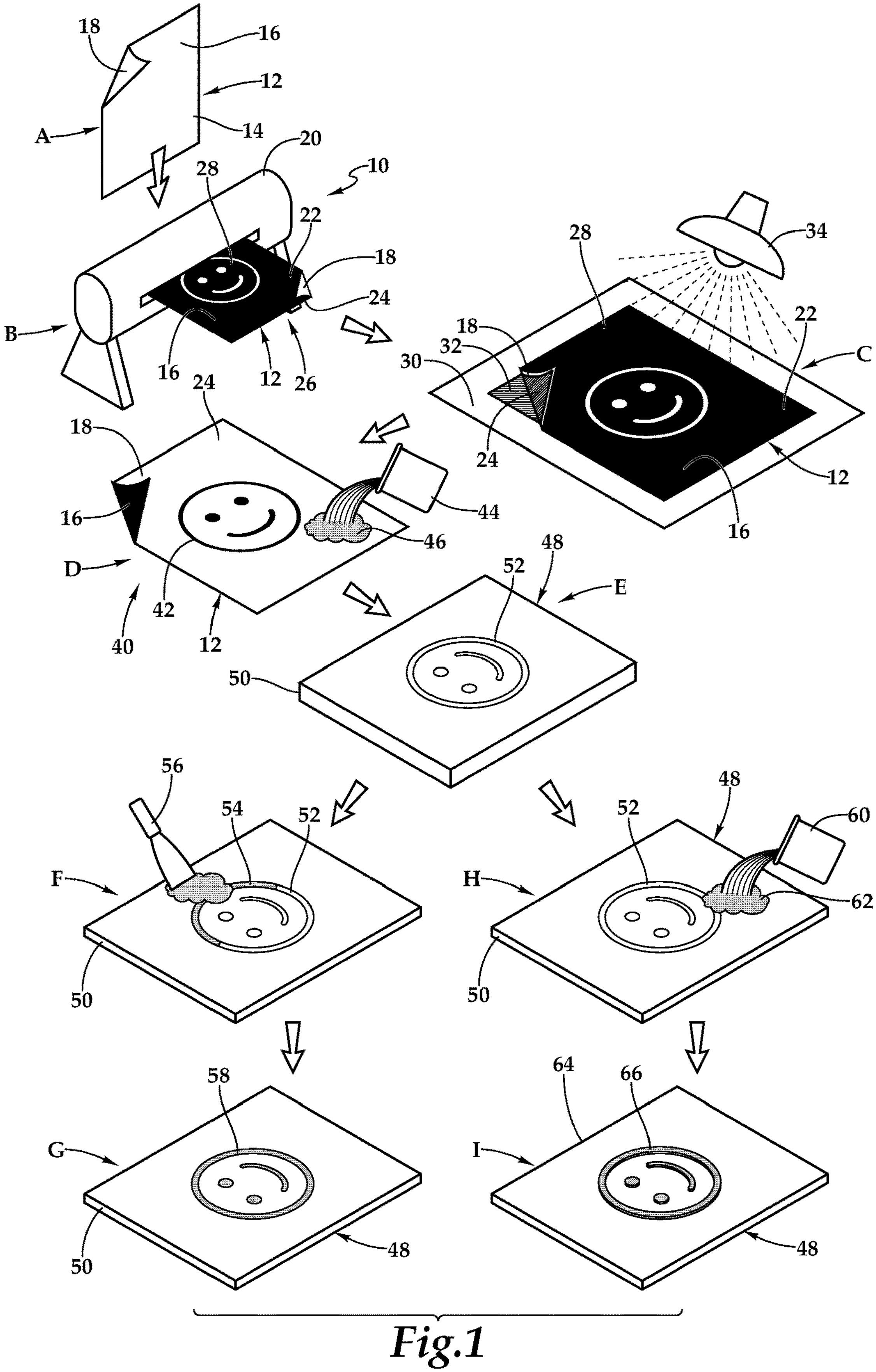
FIG. 1 is a schematic flow diagram depicting one embodiment of an imprinting film for a building material and system using the same according to the teachings presented herein.

Referring initially to FIG. 1, therein is depicted one embodiment of a system 10 for utilizing an imprinting film for a building material, depicting one embodiment of a process as shown at process blocks A, B, C, D, E, F, G, H, and I. At process block A, an imprinting film 12 includes a transparent film 14 with sides 16, 18. In one embodiment, the transparent film 14 may comprise a sheet of plastic. At process block B, a printer 20 receives the imprinting film 12 to lay down a pigment photomask 22 on the side 16 of the imprinting film 12. In this manner, the side 16 has the pigment photomask 22 and the side 18 remains clear and has a mold receiving surface 24 that is clear of pigmentation. At the conclusion of process block B, the imprinting film 12 constitutes an imprinting state 26. The pigment photomask 22 includes an image 28, which may be a logo, a graphic mark, an emblem, a symbol, or words, for example.

At process block C, the imprinting film 12 in the imprinting state 26 is set against a backing layer 30 in a flat profile. It should be appreciated that the backing layer 30 is optional and is not required by the teachings presented herein. The backing layer may be a non-reflective, hard and flat, non-porous material. In one embodiment, a light-sensitive, non-laminate adhesive layer 32 releasably bonds the imprinting film 12 to the backing layer 30. The light-sensitive, non-laminate adhesive layer 32 may be an adhesive selected from the group consisting of UV-catalyzed epoxies and acryl-based adhesives. As shown, the side 18 is set against the backing layer 30 in oppositional contact with the light-sensitive, non-laminate adhesive layer 32 interposed therebetween. In one embodiment, the side 18 is releasably bonded with the light-sensitive, non-laminate adhesive layer 32 to the backing layer 30 with an absence of air pockets between the side 18 and the backing layer 30. Further, in one embodiment, the side 18 is releasably bonded with the light-sensitive, non-laminate adhesive layer 32 to the backing layer 30 with an absence of air pockets between the side 18 at room temperature.

In another embodiment, a light-sensitive, non-laminate adhesive layer 32 is applied as a coating to the imprinting film 12. The light-sensitive, non-laminate adhesive layer 32 may be an adhesive selected from the group consisting of UV-catalyzed epoxies and acryl-based adhesives. In one implementation, the side 18 is coated via spraying, pouring, or other technique, with the light-sensitive, non-laminate adhesive layer 32. By way of example, the light-sensitive, non-laminate adhesive layer 32 may be of low viscosity and applied with a spray-coating technique, using a low-viscosity nozzle, hopper air gun, for example. Utilizing these techniques, the imprinting film 12 may be positioned on a roller conveyor belt or hung from a line, for example.

The side 16 faces outward and is irradiated by a light source 34. In one implementation, the light source 34 may be tubular fluorescent black light source or an incandescent mercury bulb source, for example. Once the light-sensitive, non-laminate adhesive layer 32 has been sufficiently exposed to the light source 34, the imprinting film 12 may be separated from the backing layer 30 and excess light-sensitive, non-laminate adhesive layer 32 cleaned off. By way of example, excess light-sensitive, non-laminate adhesive layer 32 may be cleaned by hanging up to drip in a warm room at low viscosity, including blotting with a cloth and solvent such as acetone, for example. As with all photomasks, areas that are unmasked, i.e., which remain clear pass more light than masked areas.

At process block D, in an imprinting state 40, the imprinting film 12 includes the side 18 is shown face up and the side 18 includes a relief 42 of the image 28 on the mold receiving surface 24. At this time, the mold receiving surface 24 may receive a molding material 44 which forms a layer 46 on the mold receiving surface 24. By way of example and not by way of limitation, molding material 44 further comprises a material selected from the group consisting of low-viscosity cementitious mixes, rubber mold-making mixes, and blended two-part epoxy applications.

At process block E, the molding material 44 has completely formed the layer 46 and cured. As a result, a building material 48 is furnished by the system 10 in the shape of an engraved plate 50 having an engraving 52. The building material 48 being hardened from the layer 46 of the molding material 44 and the engraving 52 being a negative impression of the relief 42.

As a first alternative, at process block F, the engraving 52 of the engraved plate 50 is filled with a crematious material such as grout 54 using a tool 56, such as a grouting knife or putty knife. The grout 54 may be allowed to set until hardened (grout 58) and then sanded back to the face of the engraved plate, as shown at process block G. As a second alternative, returning to process block D, the system 10 may advance to process block E, where the engraving plate 50 may receive a molding material 60 which forms a layer 62 on the engraving plate 50 and within the engraving 52. By way of example and not by way of limitation, the molding material 60 may be a rubber. At process block I, a mold 64 is formed. The mold may be hardened from the layer 62 of the molding material 60. As shown, the mold 64 includes a mold form 66 that is a positive impression of the relief 42.

Figure 2:
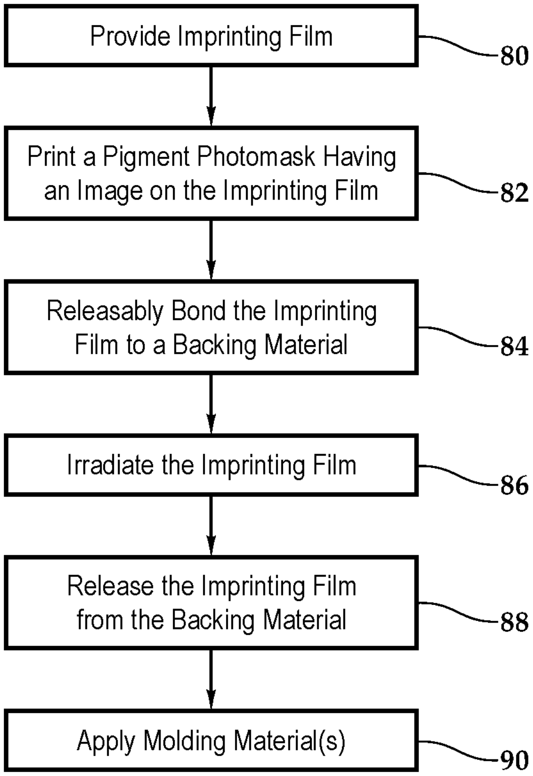
FIG. 2 is a flowchart depicting one embodiment of a method for using an imprinting film for a building material according to the teachings presented herein.

Referring now to FIG. 2, one embodiment of a method for using an imprinting film for a building material according to the teachings presented herein. At block 80, as previously discussed, an imprinting film is provided. At block 82, a pigment photomask having an image is printed onto one side of the imprinting film. At block 84, the imprinting film is releasably bonded to the backing material with, in one embodiment, a light-sensitive, non-laminate adhesive layer. At block 86, the imprinting film is irradiated and at block 88, the imprinting film is released from the backing material. At this step, any excess light-sensitive, non-laminate adhesive may be removed. The imprinting film includes a relief of the image on a mold receiving surface. At block 90, various molding materials and finishing may be done to create the building material, for example.

In some embodiments, the teachings presented herein permit the building materials industry to create large stamped products. The systems and methods presented offer a simplified alternative to chemical etching. Additionally, the systems and methods presented herein may be practiced with existing equipment, such as existing printing equipment and are fully-scalable to commercial applications. With reference to silk screening and the terminology of the art, without the paint/ink used for image transfer, there is no need for a mesh screen. Forming a high build stencil directly onto the transparent overlay, which frees the emulsion material from mesh size requirements and the drying and subsequent washing steps also offers simplification and enables the techniques presented herein to work on stone, for example.

The teachings presented herein offer, in one embodiment, a self-masking mold technique that does not use acid etch or screening mesh. In this application, the purpose is to leave a stamp in curing concrete for later grouting. The techniques may also be used with other solid-curing materials, such as pourable rubbers and epoxies, for making molds of different properties.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method for manufacturing an imprinting film for a building material, the method comprising:

providing a transparent film having a first side and a second side, the imprinting film, which includes the transparent film, having a first imprinting state and a second imprinting state, the first imprinting state including the first side having a pigment photomask and the second side having a mold receiving surface, the pigment photomask defining an image, the mold receiving surface being clear of pigmentation, the second imprinting state including the second side having a relief of the image on the mold receiving surface, the mold receiving surface configured to receive a molding material, the molding material hardening into the building material;

laying down the pigment photomask on the first side to provide the first imprinting state;

following laying down the pigment photomask, coating the second side with a light-sensitive, non-laminate adhesive layer, wherein "non-laminate" means that no second substrate is permanently bonded with the transparent film via the cured adhesive, thereby excluding a formation of a co-extended or composite laminate;

following coating the second side, irradiating the first side with a light source; and transitioning the imprinting film, which includes the transparent film, via a removal of the uncured light sensitive, non-laminate adhesive layer, from the first imprinting state to the second imprinting state where the second side includes the relief of the image on the mold receiving surface.

2. The method as recited in claim 1, wherein the transparent film comprises a sheet of plastic.

3. The method as recited in claim 1, wherein coating the second side with the light-sensitive, non-laminate adhesive layer further comprises utilizing an adhesive selected from the group consisting of UV-catalyzed epoxies and acryl-based adhesives.

4. The method as recited in claim 1, further comprising releasably bonding the second side with the light-sensitive, non-laminate adhesive layer to a backing layer at room temperature.

5. The method as recited in claim 1, further comprising releasably bonding the second side with the light-sensitive, non-laminate adhesive layer to a backing layer with an absence of air pockets between the second side and the backing layer.

6. The method as recited in claim 1, wherein irradiating the first side with the light source further comprises utilizing a source selected from the group consisting of tubular fluorescent black lights, incandescent bulbs, and mercury bulbs.

7. The method as recited in claim 1, further comprising applying the molding material to the mold receiving surface, the molding material being a material selected from the group consisting of low-viscosity cementitious mixes, rubber mold-making mixes, and blended two-part epoxy applications.

8. An imprinting film method for manufacturing an engraved plate made of a building material, the method comprising:

providing an imprinting film comprising:

a transparent film having a first side and a second side, the imprinting film, which includes the transparent film, having a first imprinting state and a second imprinting state, the first imprinting state including the first side having a pigment photomask and the second side having a mold receiving surface, the pigment photomask defining an image, the mold receiving surface being clear of pigmentation, and the second imprinting state including the second side having a relief of the image on the mold receiving surface, the mold receiving surface configured to receive a molding material;

laying down the pigment photomask on the first side to provide the first imprinting state;

following laying down the pigment photomask, coating the second side with a light-sensitive, non-laminate adhesive layer, wherein "non-laminate" means that no second substrate is permanently bonded with the transparent film via the cured adhesive, thereby excluding a formation of a co-extended or composite laminate;

following coating the second side, irradiating the first side with a light source; and transitioning the imprinting film, which includes the transparent film, via a removal of the uncured light sensitive, non-laminate adhesive layer, from the first imprinting state to the second imprinting state where the second side includes the relief of the image on the mold receiving surface;

in the second imprinting state, applying the molding material to the mold receiving surface; and hardening the molding material, thereby providing a building material in the shape of the engraved plate having an engraving, the building material being hardened from the molding material, the engraving being a negative impression of the relief.

9. The method as recited in claim 8, further comprising filling a negative impression of the relief with a cementitious material.

10. The method as recited in claim 8, wherein the transparent film is a sheet of plastic.

11. The method as recited in claim 8, wherein coating the second side with the light-sensitive, non-laminate adhesive layer further comprises utilizing an adhesive selected from the group consisting of UV-catalyzed epoxies and acryl-based adhesives.

12. The method as recited in claim 8, wherein applying the molding material to the mold receiving surface further comprises utilizing a material selected from the group consisting of low-viscosity cementitious mixes, rubber mold-making mixes, and blended two-part epoxy applications.

13. An imprinting film method for manufacturing a mold for use with a building material, the method comprising:

providing an imprinting film comprising:

a transparent film having a first side and a second side, the imprinting film, which includes the transparent film, having a first imprinting state and a second imprinting state, the first imprinting state including the first side having a pigment photomask and the second side having a mold receiving surface, the pigment photomask defining an image, the mold receiving surface being clear of pigmentation, the second imprinting state including the second side having a relief of the image on the mold receiving surface, the mold receiving surface configured to receive a first molding material;

laying down the pigment photomask on the first side to provide the first imprinting state;

following laying down the pigment photomask, coating the second side with a light-sensitive, non-laminate adhesive layer, wherein "non-laminate" means that no second substrate is permanently bonded with the transparent film via the cured adhesive, thereby excluding a formation of a co-extended or composite laminate;

following coating the second side, irradiating the first side with a light source; and transitioning the imprinting film, which includes the transparent film, via a removal of the uncured light sensitive, non-laminate adhesive layer, from the first imprinting state to the second imprinting state where the second side includes the relief of the image on the mold receiving surface;

in the second imprinting state, applying the molding material to the mold receiving surface;

hardening the first molding material, thereby providing a building material in the shape of an engraved plate having an engraving, the building material being hardened from the first molding material, the engraving being a negative impression of the relief the engraving configured to receive a second molding material; and providing a mold form in the shape of a mold, the mold form being hardened from the second molding material, the mold form being a positive impression of the relief.

14. The method as recited in claim 13, wherein the transparent film is a sheet of plastic.

15. The method as recited in claim 13, wherein coating the second side with the light-sensitive, non-laminate adhesive layer further comprises utilizing an adhesive selected from the group consisting of UV-catalyzed epoxies and acryl-based adhesives.

16. The method as recited in claim 13, wherein irradiating the first side with the light source further comprises utilizing a source selected from the group consisting of tubular fluorescent black lights and incandescent mercury bulbs.

17. The method as recited in claim 13, wherein the first molding material is a material selected from the group consisting of low-viscosity cementitious mixes, rubber mold-making mixes, and blended two-part epoxy applications.

18. The method as recited in claim 13, wherein providing the mold form in the shape of the mold further comprises utilizing a rubber as the second molding material.

* * * * *